US012671334B2

(12) United States Patent     (10) Patent No.:   US 12,671,334 B2

Chen et al.     (45) Date of Patent:    Jun. 30, 2026

(54) VOLTAGE CONVERSION DEVICE, POWER SUPPLY SYSTEM, AND INTERFERENCE SUPPRESSION METHOD

(71) Applicant: Novatek Microelectronics Corp., Hsinchu (TW)

(72) Inventors: Tuo-Kuang Chen, Hsinchu City (TW); Lo Pang-Yen Ting, Hsinchu County (TW); Nien-Hsiu Yen, Hsinchu County (TW)

(73) Assignee: Novatek Microelectronics Corp., Hsinchu (TW)

( * ) Notice: Subject to any disclaimer, the term of this patent is extended or adjusted under 35 U.S.C. 154(b) by 211 days.

(21) Appl. No.: 18/635,014

(22) Filed: Apr. 15, 2024

(65) Prior Publication Data

US 2025/0279724 A1    Sep. 4, 2025

(30) Foreign Application Priority Data

Mar. 1, 2024    (TW) ................................. 113107503

(51) Int. Cl.
*H02M 3/158*     (2006.01)
*H02M 1/00*     (2006.01)
*H02M 1/44*     (2007.01)

(52) U.S. Cl.
CPC ......... *H02M 3/158* (2013.01); *H02M 1/0025* (2021.05); *H02M 1/0038* (2021.05); *H02M 1/44* (2013.01)

(58) Field of Classification Search
CPC .... H02M 1/0025; H02M 1/0038; H02M 1/44; H02M 3/158
See application file for complete search history.

(56) References Cited

U.S. PATENT DOCUMENTS

| | | | |
|---|---|---|---|
| 9,143,039 | B2 | 9/2015 | Yang et al. |
| 9,673,727 | B2 | 6/2017 | Nishijima |
| 9,729,067 | B2 | 8/2017 | Yang et al. |
| 10,230,304 | B2 | 3/2019 | Yang et al. |

(Continued)

FOREIGN PATENT DOCUMENTS

| | | |
|---|---|---|
| CN | 106655823 | 5/2017 |
| CN | 110690829 | 1/2020 |

(Continued)

OTHER PUBLICATIONS

"Office Action of Taiwan Counterpart Application", issued on Nov. 1, 2024, p. 1-p. 7.

*Primary Examiner* — Gary L Laxton

(74) *Attorney, Agent, or Firm* — JCIPRNET

(57) ABSTRACT

A voltage conversion device, a power supply system, and an interference suppression method are provided. The voltage conversion device includes a first input terminal, a feedback controller, a masking circuit, and a driving circuit. The feedback controller provides a switching signal according to a feedback voltage. The feedback voltage is generated based on an output voltage of the voltage conversion device. The masking circuit generates a processed switching signal by masking a part of time period of the switching signal according to one of another switching signal and another switching terminal signal of another voltage conversion device. The driving circuit provides the output voltage according to a first input voltage and the processed switching signal.

14 Claims, 11 Drawing Sheets

400

(56) References Cited

U.S. PATENT DOCUMENTS

| | | | |
|---|---|---|---|
| 2013/0194837 A1 | 8/2013 | Lin et al. | |
| 2014/0233271 A1 | 8/2014 | Yang et al. | |
| 2016/0036336 A1 | 2/2016 | Yang et al. | |
| 2017/0033707 A1 | 2/2017 | Nishijima | |
| 2017/0346408 A1 | 11/2017 | Yang et al. | |
| 2024/0333132 A1* | 10/2024 | Yamada | ............. H02M 1/0009 |

FOREIGN PATENT DOCUMENTS

| | | |
|---|---|---|
| CN | 112072910 | 12/2020 |
| CN | 112104223 | 12/2020 |
| CN | 112366928 | 2/2021 |
| JP | 6544120 | 7/2019 |
| TW | 201434256 | 9/2014 |
| TW | 202306290 | 2/2023 |

* cited by examiner 440-1

VOLTAGE CONVERSION DEVICE, POWER SUPPLY SYSTEM, AND INTERFERENCE SUPPRESSION METHOD

CROSS-REFERENCE TO RELATED APPLICATION

This application claims the priority benefit of Taiwan application serial no. 113107503, filed on Mar. 1, 2024. The entirety of the above-mentioned patent application is hereby incorporated by reference herein and made a part of this specification.

BACKGROUND

Technical Field

The disclosure relates to an interference processing technology for power conversion, and particularly relates to a voltage conversion device, a power supply system, and an interference suppression method.

Description of Related Art

A voltage converter or voltage conversion device converts a received voltage into a rectified DC voltage, which is used to supply various electronic components. The voltage converter has a variety of applications, such as a boost converter, a buck converter, a buck-boost converter, etc. When being configured on a printed circuit board, the voltage converter will be affected by the parasitic capacitance in the printed circuit board and power transistor. For example, when a power converter operates by switching internal switches, there is often resonance interference at the switching point of the switching signal. Moreover, when the load current of the voltage converter increases, the degree of resonance interference will become more severe.

Moreover, electronic devices often have a plurality of voltage converters for power supply. The voltage converter with a larger load current has a large resonance interference, and such a resonance interference will also affect other voltage converters through common terminals (e.g., common ground, common power supply), which may cause abnormalities in the internal switching signals of the power converter, leading to irregular functions of the power converter.

SUMMARY

The disclosure provides a voltage conversion device, a power supply system, and an interference suppression method, which can mask resonance interference from other voltage conversion devices and maintain the stability of the voltage conversion function.

A voltage conversion device according to an embodiment of the disclosure includes a first input terminal, a feedback controller, a masking circuit, and a driving circuit. The first input terminal is configured to obtain a first input voltage. The feedback controller provides a switching signal according to a feedback voltage. The feedback voltage is generated based on an output voltage of the voltage conversion device. The masking circuit is coupled to the feedback controller to generate a processed switching signal by masking a part of time period of the switching signal according to one of another switching signal and another switching terminal signal of another voltage conversion device. The driving circuit is coupled to the first input terminal and the masking circuit for providing the output voltage according to the first input voltage and the processed switching signal.

A power supply system according to an embodiment of the disclosure includes a first voltage conversion device and a second voltage conversion device. The first voltage conversion device is coupled to a first ground terminal and a second ground terminal. The first voltage conversion device converts a first input voltage into a first output voltage according to a first switching signal and a first switching terminal signal. The second voltage conversion device includes a first input terminal, a feedback controller, a masking circuit, and a driving circuit. The first input terminal is configured to obtain the first input voltage. The feedback controller is coupled to the second ground terminal and configured to provide a second switching signal according to a feedback voltage. The feedback voltage is generated based on a second output voltage of the second voltage conversion device. The masking circuit is coupled to the feedback controller to generate a processed switching signal by masking a part of time period of the second switching signal according to one of the first switching signal and the first switching terminal signal. The driving circuit is coupled to the first input terminal and the masking circuit for providing the second output voltage according to a second input voltage and the processed switching signal.

An interference suppression method according to an embodiment of the disclosure is adapted for a voltage conversion device. The interference suppression method includes the following steps. A first switching signal is provided according to a feedback voltage, where the feedback voltage is generated based on an output voltage of the voltage conversion device. A processed switching signal is generated by masking a part of time period of the first switching signal according to one of another switching signal and another switching terminal signal of another voltage conversion device. The output voltage is provided according to a first input voltage and the processed switching signal.

Based on the above, the voltage conversion device, the power supply system, and the interference suppression method according to the embodiments of the disclosure are to add the masking circuit to the voltage conversion device to detect the switching signals or switching terminal signals of other voltage conversion devices with common nodes and correspondingly mask its own switching signal for a part of time period, so that the switching signal may be prevented from being accidentally subjected to resonance interference of other voltage conversion devices and causing malfunction during the part of time period when the switching signal is masked. Therefore, the embodiments of the disclosure can mask resonance interference from other voltage conversion devices to maintain the stability of its own voltage conversion function.

DESCRIPTION OF THE EMBODIMENTS

Figure 1:
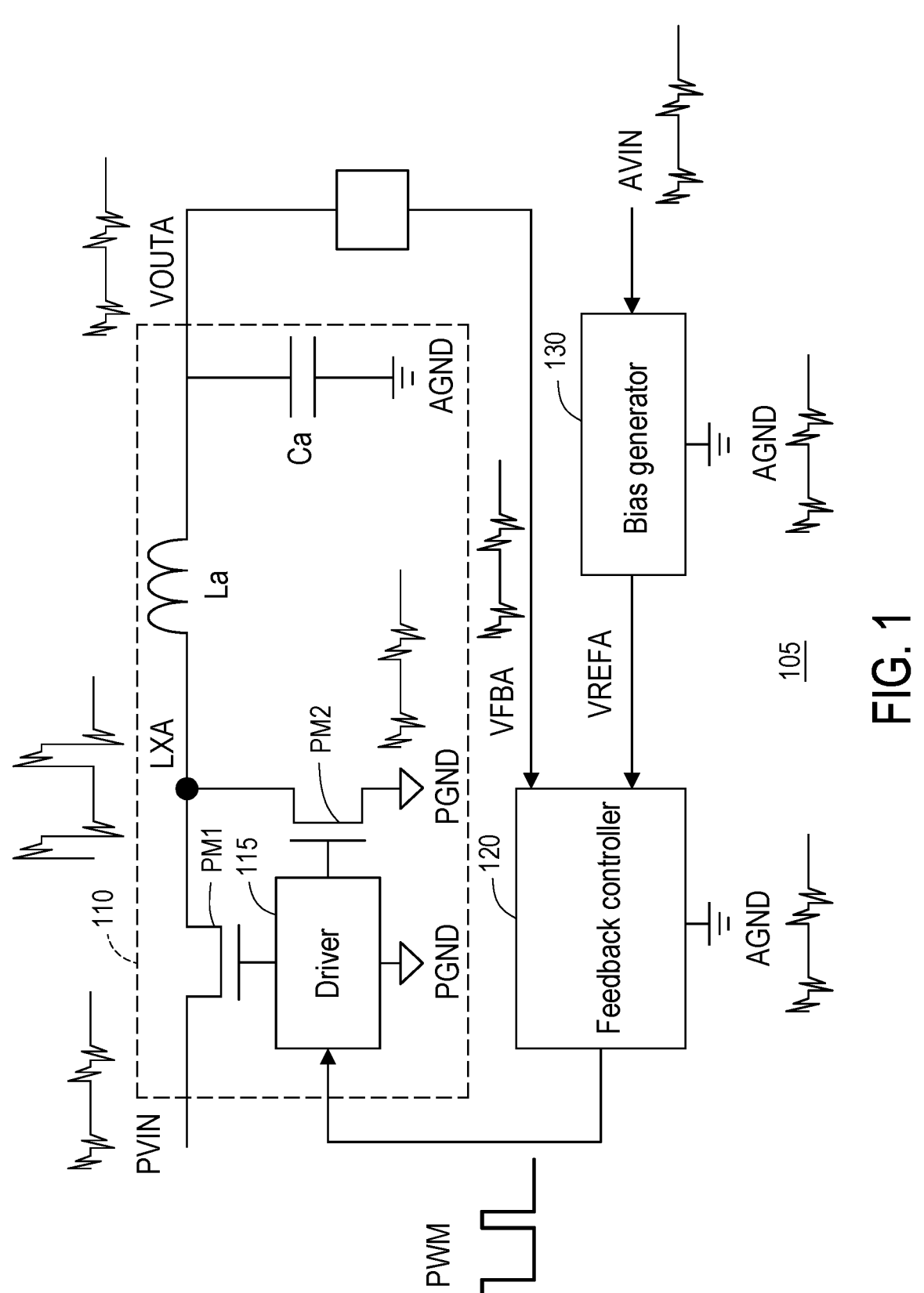
FIG. 1 is a schematic block diagram of a voltage conversion device according to a corresponding embodiment of the disclosure.

FIG. 1 is a schematic block diagram of a voltage conversion device 105 according to a corresponding embodiment of the disclosure. The voltage conversion device 105 is one of the circuit structures of the voltage conversion device described in the embodiment and is configured to illustrate resonance interference. Those who apply the embodiment can use voltage converters with different circuit structures to form the voltage conversion device 105 according to their requirements.

The voltage conversion device 105 in FIG. 1 may include a driving circuit 110, a feedback controller 120, a bias generator 130, and other components. The driving circuit 110 may include power transistors PM1 and PM2, a driver 115, and an inductor-capacitor circuit composed of an inductor La and a capacitor Ca. The voltage conversion device 105 is configured to convert a voltage of an input terminal PVIN in a first voltage range (the first voltage range is, for example, between a corresponding voltage of a power supply voltage terminal PVIN and a corresponding voltage of a ground voltage PGND) to a voltage of an output terminal VOUTA in a second voltage range (the second voltage range is, for example, between a corresponding voltage of a power supply voltage terminal AVIN and a corresponding voltage of a ground voltage terminal AGND). In detail, the driving circuit 110 operates in the first voltage range. That is, a power terminal of the driving circuit 110 is coupled to the power supply voltage PVIN, and a ground terminal of the driving circuit 110 is coupled to the ground voltage PGND. The feedback controller 120, the bias generator 130, and the capacitor Ca operate in the second voltage range. That is, power terminals of the feedback controller 120 and the bias generator 130 are coupled to the power supply voltage AVIN, and ground terminals of the feedback controller 120 and the bias generator 130 and one end of the capacitor Ca are coupled to the ground voltage AGND. The voltage conversion device 105 also includes the output terminal VOUTA, the input terminals PVIN and AVIN, a switching terminal LXA, and the ground terminals PGND and AGND.

A voltage of a feedback terminal VFBA is generated or adjusted accordingly based on the voltage on the output terminal VOUTA. The bias generator 130 generates a reference voltage VREFa on a reference terminal VREFA based on a voltage of the input terminal AVIN. The feedback controller 120 generates a switching signal PWM based on the voltage of the feedback terminal VFBA and the voltage of the reference terminal VREFA. The driving circuit 110 controls the switching of the power transistors PM1 and PM2 according to the switching signal PWM, thereby realizing the function of the voltage conversion device 105. As can be seen from FIG. 1, due to the parasitic capacitance on the printed circuit board or power transistor, the waveform of the switching signal PWM will affect the signals at each voltage node, thus causing resonance interference, such as the input terminals PVIN and AVIN, the switching terminal LXA, the output terminal VOUTA, the ground terminals PGND and AGND, the feedback terminal VFBA . . . etc.

Figure 2:
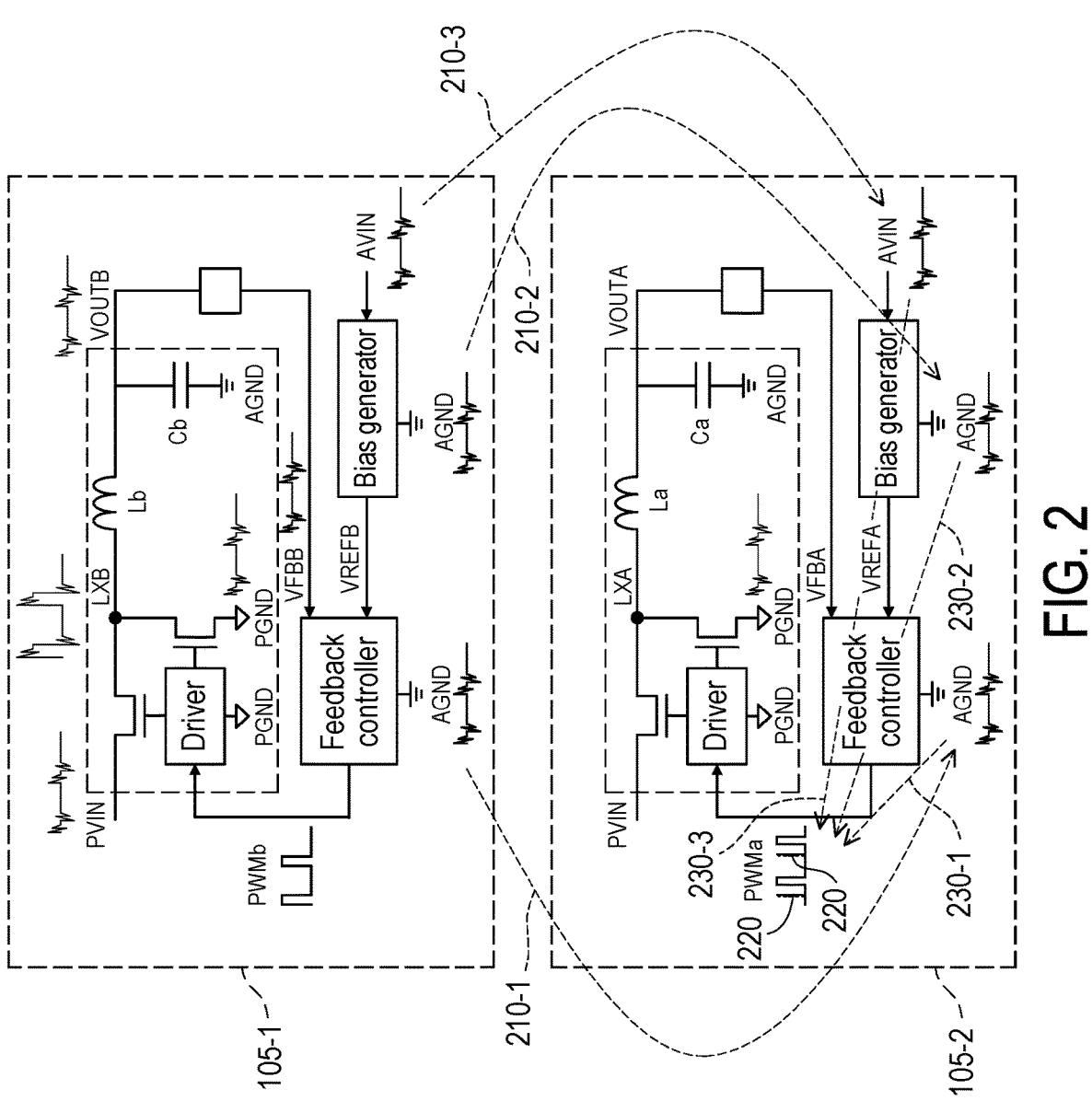
FIG. 2 is a schematic block diagram of two voltage conversion devices according to a corresponding embodiment of the disclosure.

In the case where there are a plurality of sets of voltage conversion devices, the aforementioned resonance interference will affect other voltage conversion devices through the common input terminal and common ground terminal connected to these voltage conversion devices. FIG. 2 is a schematic block diagram of two voltage conversion devices 105-1 and 105-2 according to a corresponding embodiment of the disclosure. The ground terminals PGND and AGND and the input terminal AVIN of the voltage conversion devices 105-1 and 105-2 are all common terminals, so the resonance interference of the voltage conversion device 105-1 will affect the corresponding nodes in the voltage conversion device 105-2 through these common terminals (as shown as arrows 210-1 to 210-3 in FIG. 2). The resonance interference indicated by arrows 210-1 to 210-3 will further affect a switching signal PWMa in the voltage conversion device 105-2 (as shown by arrows 230-1 to 230-3 in FIG. 2), so that the switching signal PWMa is induced to have a resonance pulse 220 due to resonance interference, causing the voltage conversion device 105-2 to malfunction. In FIG. 2, the voltage conversion devices 105-1 and 105-2 respectively represent different voltage conversion channels, so output terminals VOUTB and VOUTA of the voltage conversion devices 105-1 and 105-2 are not connected. If FIG. 1 shows a multi-phase single output voltage conversion device, the output terminals VOUTB and VOUTA of the voltage conversion devices 105-1 and 105-2 will also be connected, which then further causes the switching signal (such as the switching signal PWMa of the voltage conversion device 105-2) to be more seriously affected by resonance interference, causing functional abnormalities of the voltage conversion devices 105-1 and 105-2.

Figure 3C:
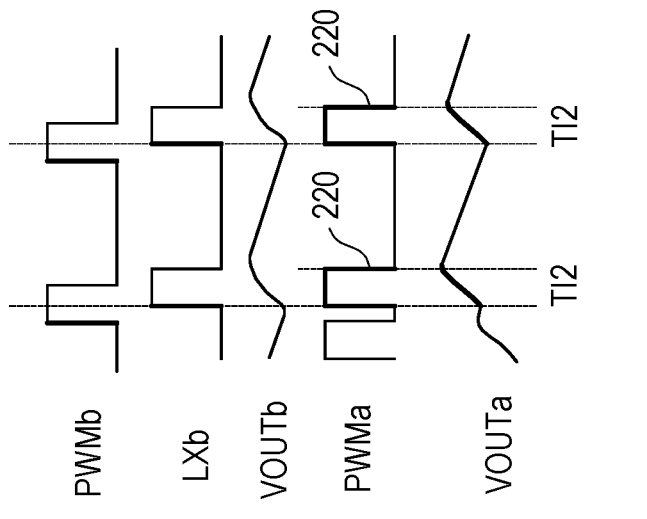
FIG. 3A to FIG. 3C are schematic block diagrams of a switching signal, a switching terminal signal, and an output signal at an output terminal in a voltage conversion device in FIG. 2.
Figure 3B:
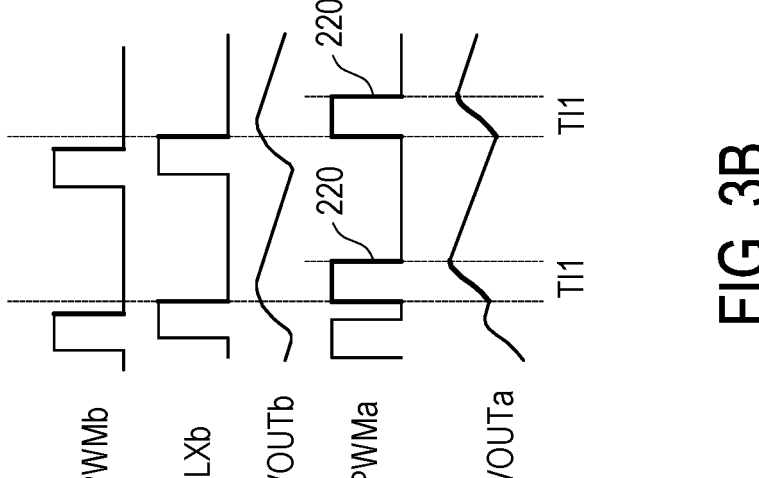
Figure 3A:
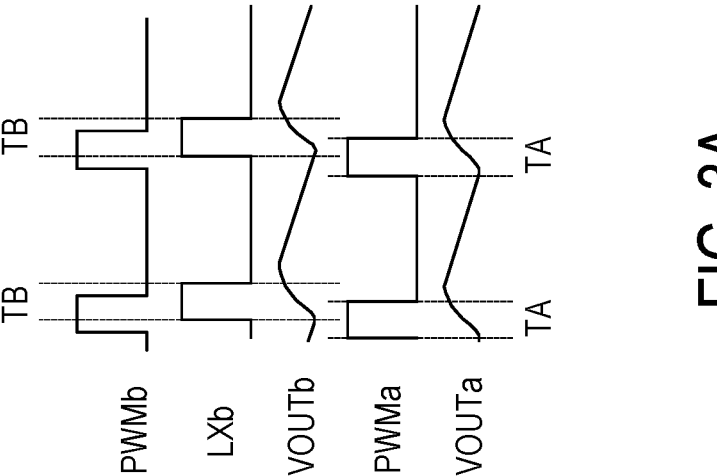

FIG. 3A to FIG. 3C are schematic block diagrams of switching signals PWMa and PWMb, a switching terminal signal LXb, an output signal VOUTa of the output terminal VOUTA, and an output signal VOUTb of the output terminal VOUTB in the voltage conversion devices 105-1 and 105-2 in FIG. 2. FIG. 3A shows ideal signal waveforms in which the voltage conversion devices 105-1 and 105-2 are not subjected to resonance interference from each other. It can be seen from FIG. 3A that the switching signal PWMa of the voltage conversion device 105-1 will cause the output signal VOUTA to increase during an enabling period TA; the switching signal PWMb of the voltage conversion device 105-2 causes the output signal VOUTB to increase during an enabling period TB.

It is assumed here that the resonance interference of the voltage conversion device 105-1 affects each signal in the voltage conversion device 105-2, and is shown in FIG. 3A and FIG. 3C. FIG. 3B shows a signal waveform when the voltage conversion device 105-1 is subjected to resonance interference of the voltage conversion device 105-1, and the switch in the voltage conversion device 105-1 is subjected to resonance interference when the falling edge of the signal is triggered. During an interference period TI1 in FIG. 3B, the voltage conversion device 105-1 is subjected to resonance interference of the switching terminal signal LXb in the voltage conversion device 105-2, so that the switch of the voltage conversion device 105-1 is turned on at the falling edge time point of the switching terminal signal LXb., and then malfunction occurs, causing the output signal VOUTa to increase. FIG. 3C shows the signal waveform when the voltage conversion device 105-1 is subjected to resonance interference of the voltage conversion device 105-1, and the switch in the voltage conversion device 105-1 is subjected to interference when the rising edge of the signal is triggered. During an interference period TI2 in FIG. 3C, the voltage conversion device 105-1 is subjected to resonance interference of the switching terminal signal LXb in the voltage conversion device 105-2, so that the switch of the voltage conversion device 105-1 is turned on at the rising edge time point of the switching terminal signal LXb, and then malfunction occurs, causing the output signal VOUTa to increase. Due to the aforementioned resonance interference, the switching signal PWMa in the voltage conversion device 105-1 may have a resonance pulse 220 due to the switching signal PWMb in the voltage conversion device 105-2, causing the voltage conversion device 105-1 to be unable to maintain its own steady state, thus resulting in a relatively large and irregular output voltage ripple.

Embodiments of the disclosure add a masking circuit to the voltage conversion device to prevent resonance interference from other voltage conversion devices by detecting switching signals of other voltage conversion devices with common nodes. Various embodiments consistent with the disclosure and corresponding details are described in detail herein.

Figure 4:
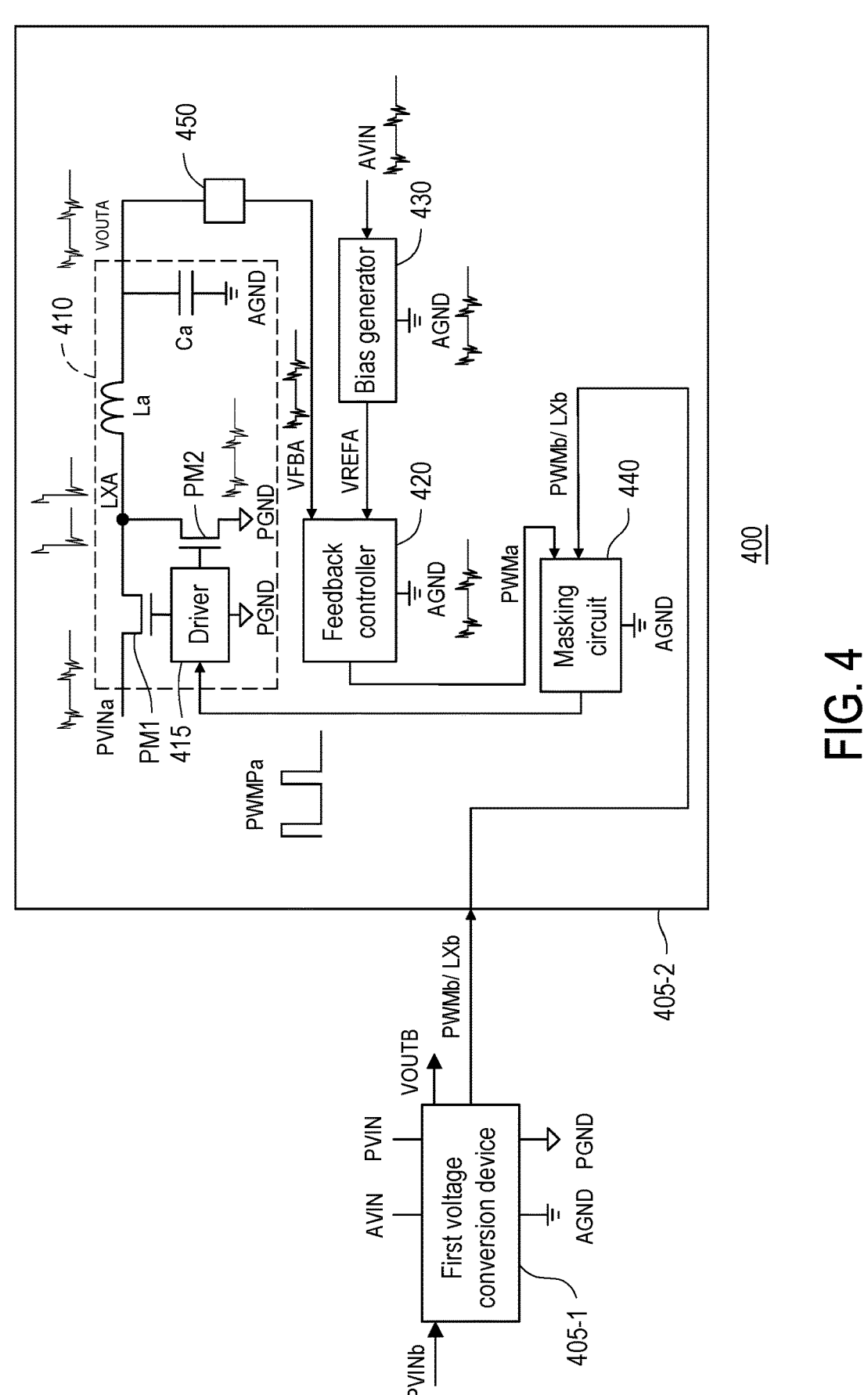
FIG. 4 is a schematic block diagram of a power supply system according to an embodiment of the disclosure.

FIG. 4 is a schematic block diagram of a power supply system 400 according to an embodiment of the disclosure. The power supply system 400 may be composed of a first voltage conversion device 405-1 and a second voltage conversion device 405-2. Although the power supply system 400 in FIG. 4 only shows two voltage conversion devices, the embodiment can be applied to a plurality of voltage conversion devices. For example, the power supply system may have three or more voltage conversion devices. Therefore, those who apply the embodiment can adjust the number of voltage conversion devices according to their requirements. The power supply system 400 of the embodiment of the disclosure mainly uses the first voltage conversion device 405-1 and other voltage conversion devices as interference sources, and uses the second voltage conversion device 405-2 as an example of the interference suppression method.

The first voltage conversion device 405-1 and the second voltage conversion device 405-2 have common terminals, such as the ground terminals PGND and AGND and the corresponding power supply voltage terminal PVIN. In the embodiment, the first voltage conversion device 405-1 and the second voltage conversion device 405-2 are respectively different voltage conversion channels and supply power to different electronic components. The first voltage conversion device 405-1 and the second voltage conversion device 405-2 may have the same circuit structure, or the two voltage conversion devices may have different circuit structures according to the requirements of those who apply the embodiment. For convenience of explanation, it is assumed here that the first voltage conversion device 405-1 is the interference source, and the second voltage conversion device 405-2 is used as the main description object of the embodiment.

The first voltage conversion device 405-1 is coupled to the first ground terminal PGND and the second ground terminal AGND. The first voltage conversion device 405-1 converts an input voltage on an input terminal PVINb into the output voltage VOUTb according to the switching signal PWMb or the switching terminal signal LXb.

The second voltage conversion device 405-2 mainly includes an input terminal PVINa, a driving circuit 410, a feedback controller 420, and a masking circuit 440. The second voltage conversion device 405-2 may also include a bias generator 430 and a feedback voltage generator 450.

The driving circuit 410 includes a driver 415, a first switch (implemented by a power diode PM1), a second switch (implemented by a power diode PM2), the inductor La, and the capacitor Ca. The driver 415 is coupled to the ground terminal PGND. The driver 415 generates a first switching control signal and a second switching control signal based on a processed switching signal PWMPa. A first terminal of the power diode PM1 is coupled to the input terminal PVINa. A control terminal of the power diode PM1 receives the first switching control signal. A first terminal of the power diode PM2 is coupled to a second terminal of the power diode PM2. A control terminal of the power diode PM2 receives the second switching control signal. The second terminal of the power diode PM2 is coupled to the ground terminal PGND. The inductor La and the capacitor Ca form an inductor-capacitor circuit. A first terminal of the inductor La in the inductor-capacitor circuit serves as an input terminal of the inductor-capacitor circuit, and the input terminal is coupled to the second terminal of the power diode PM1 to serve as the switching terminal LXA. A second terminal of the capacitor Ca is coupled to the ground terminal AGND. A second terminal of the inductor La in the inductor-capacitor circuit is coupled to a first terminal of the capacitor Ca to serve as the output terminal VOUTA of the voltage conversion device.

The input terminal PVINa can obtain an input voltage. The feedback controller 420 is coupled to the second ground terminal AGND. The feedback controller 420 provides the switching signal PWMa according to a feedback voltage on the feedback terminal VFBA. The feedback voltage is generated based on the second output voltage VOUTa of the second voltage conversion device 405-2. The bias generator 430 is coupled to the second input terminal AVIN to obtain a second input signal, and the bias generator 430 is also coupled to the ground terminal AGND. The bias generator 430 generates the reference voltage VREFa on the reference terminal VREFA according to the second input signal. The feedback voltage generator 450 is coupled to the output terminal VOUTA of the voltage conversion device. The feedback voltage generator 450 generates the feedback voltage on the feedback terminal VFBA according to the output voltage on the output terminal VOUTA.

The masking circuit 440 is coupled to the feedback controller 420. The masking circuit 440 generates the processed switching signal PWMPa by masking a part of time period of the switching signal PWMa according to one of the switching signal PWMb and the switching terminal signal LXb from the first voltage conversion device 405-1. The driving circuit 410 is coupled to the second input terminal PVINa to receive a second input voltage. The driving circuit 410 is coupled to the masking circuit 440 to receive the processed input signal PWMPa. The driving circuit 410 provides the second output voltage VOUTa according to the second input voltage and the processed switching signal PWMPa.

In the embodiment, the masking circuit 440 is added to the second voltage conversion device 405-2 to detect the switching signal (such as the switching signal PWMb) or the switching terminal signal (such as switching terminal signal LXb) of other voltage conversion devices (such as the first voltage conversion device 405-1) with common nodes and correspondingly mask its own switching signal PWMa for a part of time period, so that the switching signal may be prevented from being accidentally subjected to resonance interference of other voltage conversion devices and causing malfunction during the part of time period when the switching signal is masked.

Figure 5:
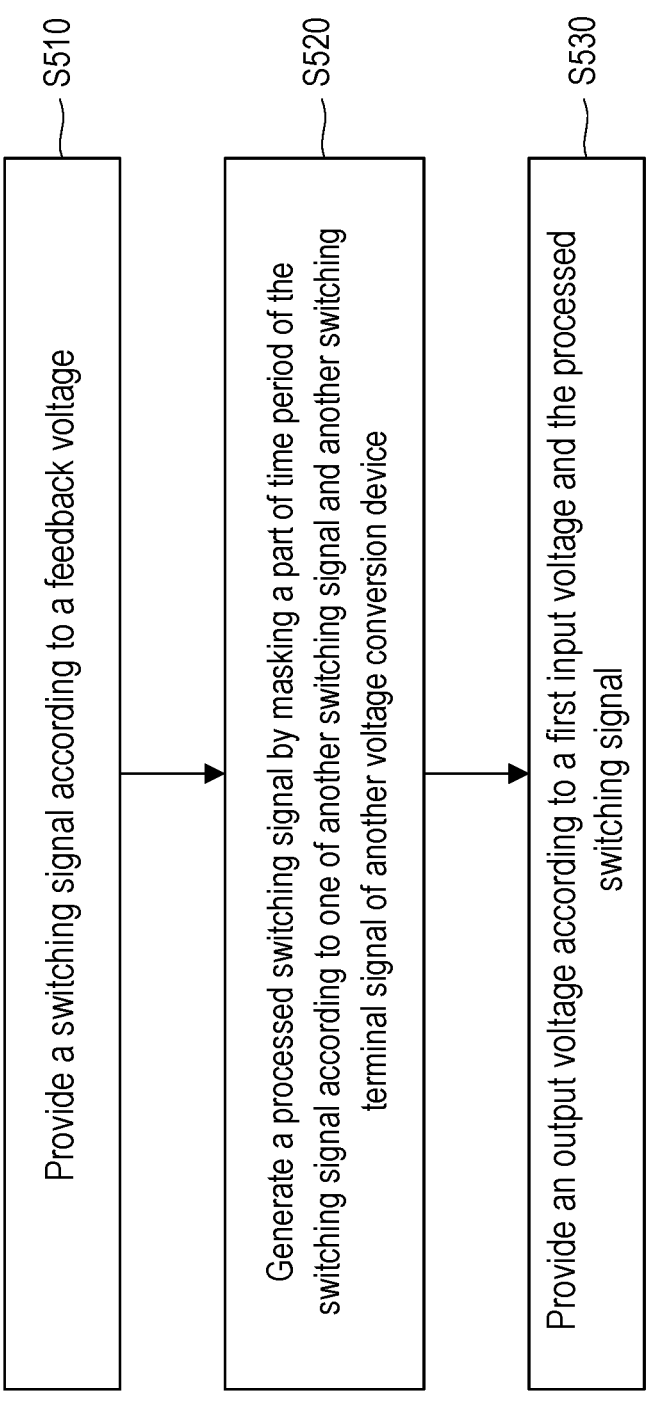
FIG. 5 is a flowchart of an interference suppression method according to an embodiment of the disclosure.

FIG. 5 is a flowchart of an interference suppression method according to an embodiment of the disclosure. The interference suppression method described in FIG. 5 is applicable to the power supply system 400 and the second voltage conversion device 405-2 in FIG. 4. Referring to FIG. 5, in step S510, the feedback controller 420 in the second voltage conversion device 405-2 provides the switching signal PWMa according to the feedback voltage on the feedback terminal VFBA. The feedback voltage is generated based on the output voltage of the output terminal VOUTA of the second voltage conversion device 405-2. In step S520, the masking circuit 440 in the second voltage conversion device 405-2 generates the processed switching signal PWMPa by masking a part of time period of the switching signal PWMa according to one of another switching signal (for example, the switching signal PWMb) and another switching terminal signal (for example, the switching terminal signal LXb) of another voltage conversion device (for example, the first voltage conversion device 405-1). In step S530, the driving circuit 410 in the second voltage conversion device 405-2 provides the output voltage of the output terminal VOUTA in the second voltage conversion device 405-2 according to the first input voltage (for example, the voltage on the input terminal PVINa) and the processed switching signal PWMPa. For other details of steps S510 to S530, please refer to various embodiments of the disclosure.

Various embodiments of the disclosure can implement the masking circuit 440 in FIG. 4 and step S520 in FIG. 5 through different technologies. For example, when the masking circuit 440 masks a part of time period of the switching signal PWMa that is easily interfered by another voltage conversion circuit, the masking time length may be a pre-designed fixed time length (which may be referred to as a "fixed masking time"), or can be automatically and dynamically adjusted (which may be referred to as a "dynamic masking time"). The foregoing technology is described below by distinguishing different embodiments. The following describes the foregoing technical solution by distinguishing different embodiments.

Figure 6:
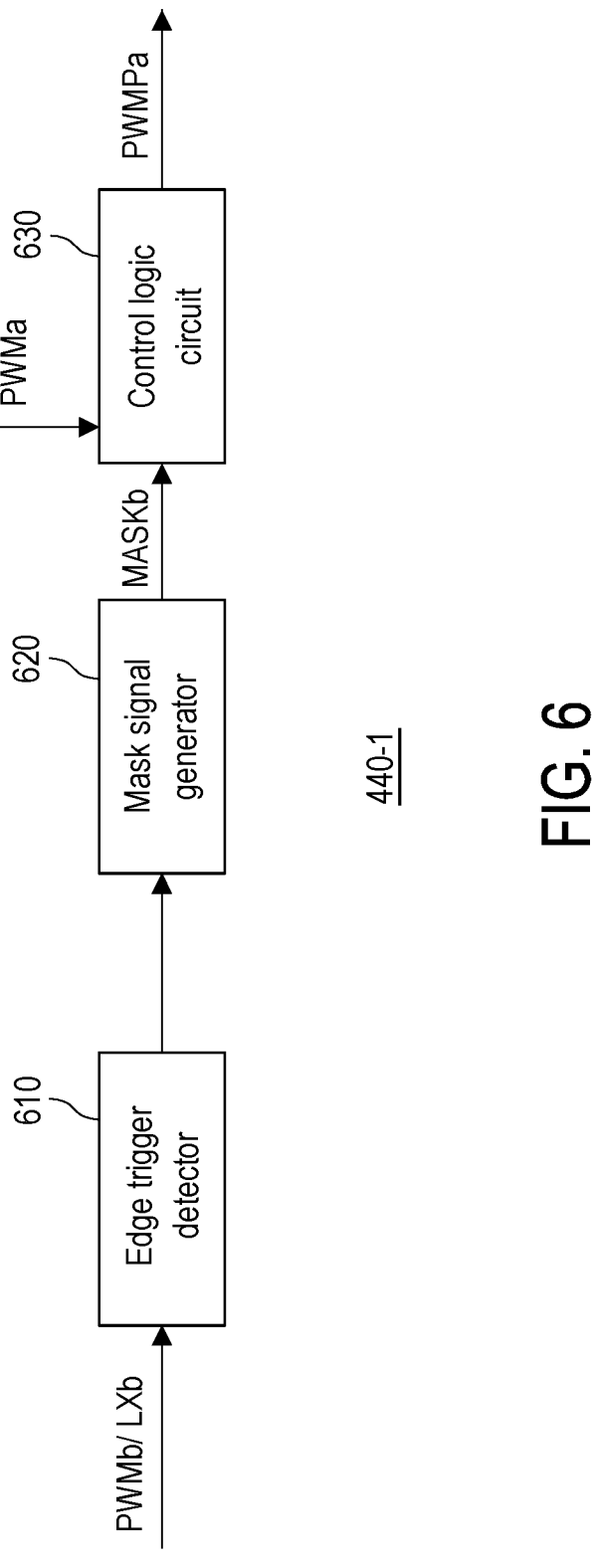
FIG. 6 is a detailed block diagram of the masking circuit in FIG. 4 according to a first embodiment of the disclosure.
Figure 7A:
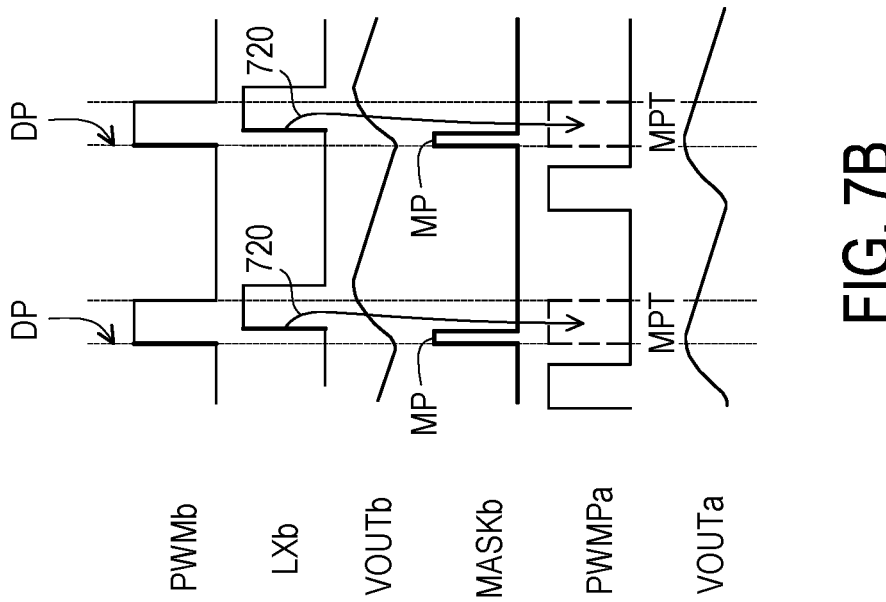
FIG. 7A and FIG. 7B are schematic waveform diagrams corresponding to various signals in a power supply system according to a first embodiment of the disclosure.
Figure 7B:
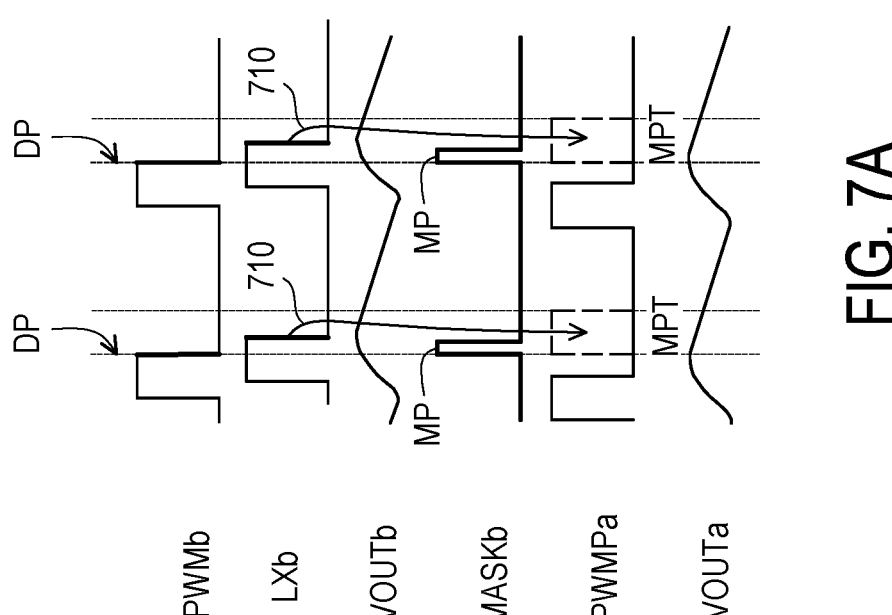

A first embodiment of the disclosure mainly shows the implementation of the aforementioned "fixed masking time" with reference to FIG. 6, FIG. 7A, FIG. 7B and corresponding paragraphs. FIG. 6 is a detailed block diagram of a masking circuit 440-1 in FIG. 4 according to the first embodiment of the disclosure. FIG. 7A and FIG. 7B are schematic waveform diagrams corresponding to various signals in the power supply system 400 according to the first embodiment of the disclosure. FIG. 7A shows the waveforms of various signals of the second voltage conversion device 405-2 in FIG. 4 when the falling edge is triggered, and FIG. 7B shows the waveforms of various signals of the voltage conversion device 405-2 in FIG. 4 when the rising edge is triggered.

Referring to FIG. 6, FIG. 7A, and FIG. 7B, the masking circuit 440-1 may include an edge trigger detector 610, a mask signal generator 620, and a control logic circuit 630. In FIG. 4, the second voltage conversion device 405-2 may be affected by the switching terminal signal LXb in the first voltage conversion device 405-1, causing the original switching signal to generate pulses and resulting in malfunction, as shown in the switching signal PWMa and the resonance pulse 220 in FIG. 3B and FIG. 3C. and an arrow 710 in FIG. 7A and an arrow 710 in FIG. 7B.

The edge trigger detector 610 of the embodiment obtains one of the switching signal PWMb and the switching terminal signal LXb from the first voltage conversion device 405-1 in FIG. 4, and determines the triggering time point of one of the switching signal PWMb and the switching terminal signal LXb (for example, FIG. 7A shows a detection of a triggering time point DP when the falling edge is triggered in the switching signal PWMb, and FIG. 7B shows a detection of a triggering time point DP when the rising edge trigger is triggered in the switching signal PWMb). This triggering time point is determined based on the triggering mechanism of the driving circuit 410 in the voltage conversion device 405-2. If the driving circuit 410 performs voltage conversion for the falling edge trigger, this triggering time point is a detection of the time point when the falling edge is triggered in the switching signal PWMb; if the driving circuit 410 performs voltage conversion for the rising edge trigger, this triggering time point is a detection of the time point when the rising edge is triggered in the switching signal PWMb.

The mask signal generator 620 is coupled to the edge trigger detector 610. The mask signal generator 620 is configured to generate a mask signal (e.g., a mask signal MASKb described in FIG. 7A and FIG. 7B). The mask signal MASKb includes a masking pulse MP corresponding to the triggering time point DP. The control logic circuit 630 is coupled to the mask signal generator 620. The control logic circuit 630 generates the processed switching signal PWMPa by masking a part of time period MPT of the switching signal PWMa based on the masking pulse MP in the mask signal MASKb. The "part of time period MPT" in the embodiment is a fixed time length.

The embodiment can use the edge trigger detector 610 in FIG. 6 to detect the falling edge/rising edge of the switching terminal signal LXb to obtain the edge triggering time point DP. However, due to the propagation delay in the circuit, if the switching terminal signal LXb is used as the basis for the aforementioned judgment, there may sometimes be a risk that the interference from the switching terminal signal LXb itself may not be immediately masked. On the other hand, the waveform of the switching signal PWMb is ahead of the switching terminal signal LXb. Therefore, by using the falling edge/rising edge of the switching signal PWMb to know the triggering time point DP, the interference from the switching terminal signal LXb can be dealt with more certainty.

Figure 8:
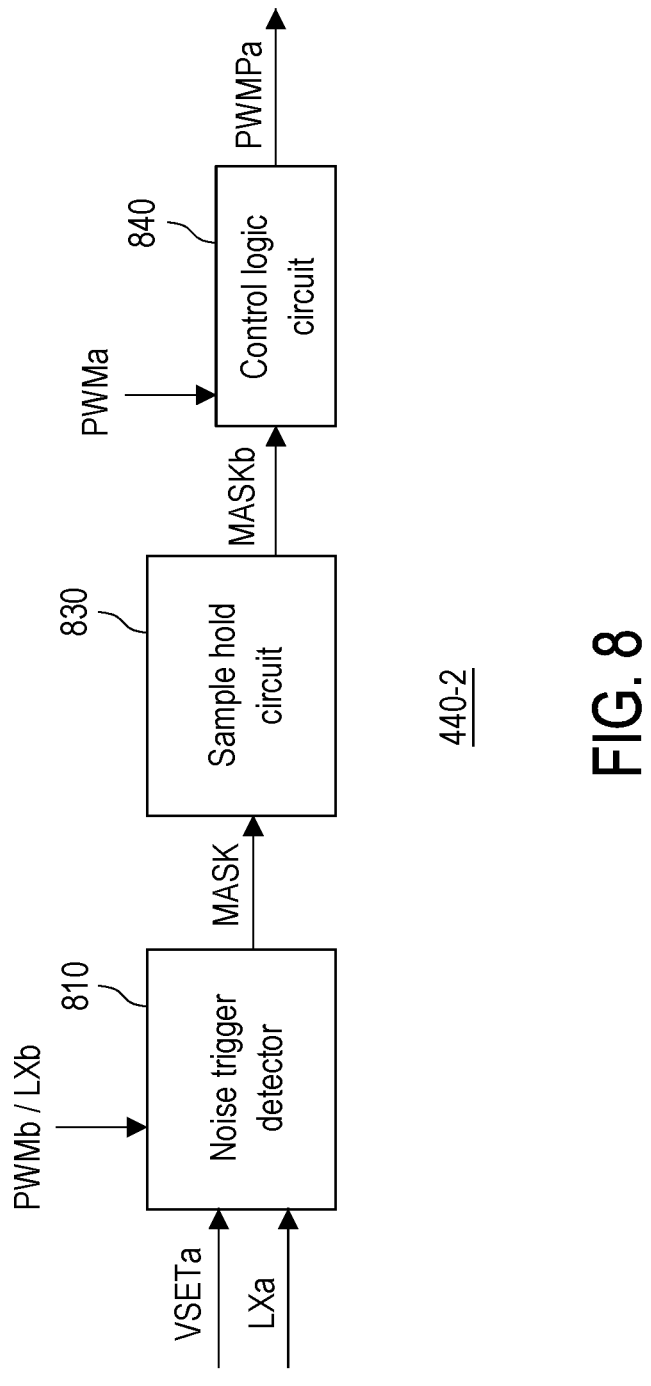
FIG. 8 is a detailed block diagram of the masking circuit in FIG. 4 according to a second embodiment of the disclosure.
Figure 9:
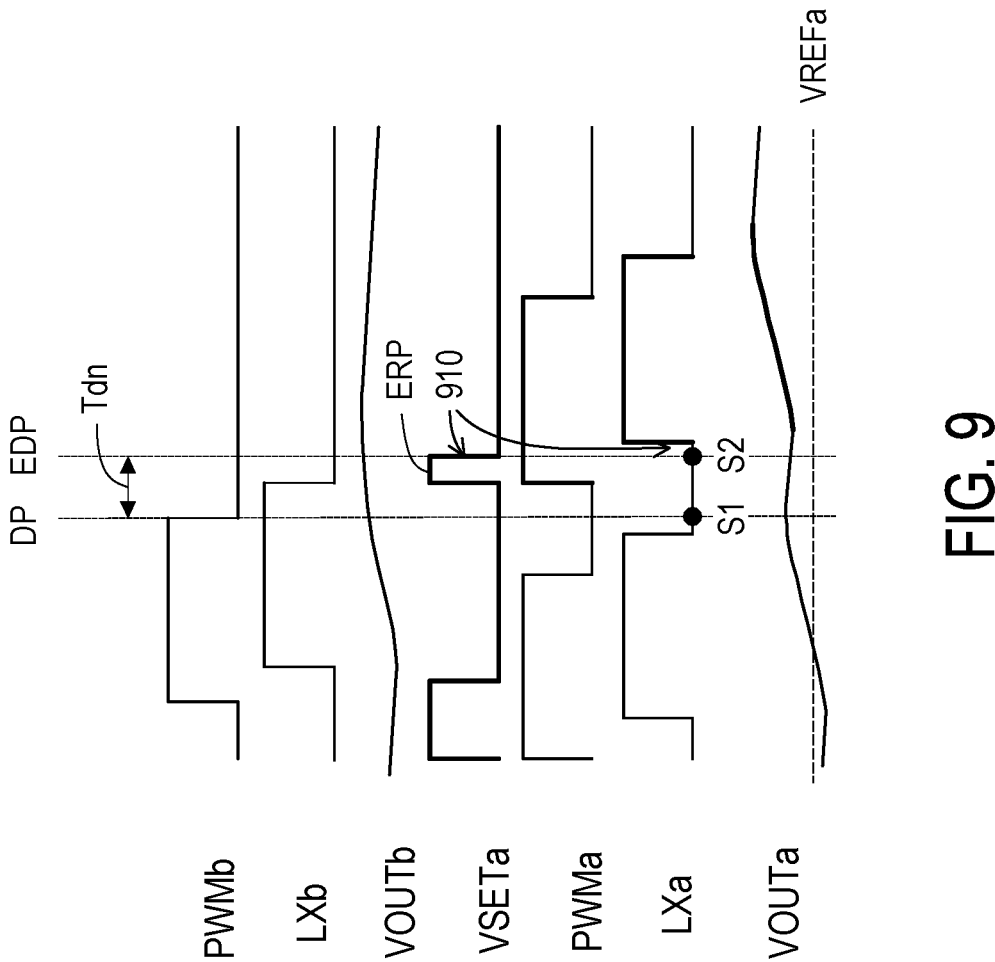
FIG. 9 is a schematic waveform diagram corresponding to various signals in a power supply system according to a second embodiment of the disclosure.

A second embodiment of the disclosure mainly shows the implementation of the aforementioned "dynamic masking time" with reference to FIG. 8 and FIG. 9 and corresponding paragraphs. FIG. 8 is a detailed block diagram of a masking circuit 440-2 in FIG. 4 according to the second embodiment of the disclosure. FIG. 9 is a schematic waveform diagram corresponding to various signals in a power supply system according to the second embodiment of the disclosure.

Referring to FIG. 8 and FIG. 9, the masking circuit 440-2 may include a noise trigger detector 810, a sample hold circuit 830, and a control logic circuit 840. The sample hold circuit 830 is coupled to the noise trigger detector 810. The control logic circuit 840 is coupled to the sample hold circuit 830.

The noise trigger detector 810 is configured to determine the triggering time point of one of another switching signal PWMb and another switching terminal signal LXb in another voltage conversion circuit, and provide a mask signal MASK based on a setting signal VSETa and a switching terminal signal LXa related to the output voltage VOUTa and the preset reference voltage VREFa. The sample hold circuit 830 correspondingly generates the mask signal MASKb based on the mask signal MASK. Here, the triggering time point DP when the falling edge is triggered in the switching signal PWMb in FIG. 9 is used as an example of the triggering time point, and at this time, the driving circuit 410 in FIG. 4 performs voltage conversion for the falling edge trigger. Those who apply the embodiment can also design the driving circuit 410 in FIG. 4 as a rising edge trigger to perform voltage conversion, which is another embodiment and has different waveforms from the various signals described in FIG. 9.

The setting signal VSETa in FIG. 8 is obtained by comparing the output voltage VOUTa of the voltage conversion circuit 405-2 with the preset reference voltage VREFa through a voltage comparator. Specifically, when the output voltage VOUTa is less than the reference voltage VREFa, the setting signal VSETa is set to logic 1, which means that the voltage conversion circuit 405-2 needs to output increased energy, so the voltage conversion circuit 405-2 will generate the switching signal PWMa based on the setting signal VSETa of logic 1, thereby causing the switching terminal signal LXa on the switching terminal LXA in the voltage conversion circuit 405-2 to change state and causing the output voltage VOUTa to rise. Correspondingly, when the output voltage VOUTa is greater than the reference voltage VREFa, it means that the output voltage of the voltage conversion circuit 405-2 is sufficient, so the setting signal VSETa is set to logic 0. However, the setting signal VSETa will still be affected by the resonance interference of another voltage conversion circuit 405-1 and generate interference pulses (such as an interference pulse ERP in FIG. 9) and cause malfunction, thereby breaking the feedback stability of the voltage conversion circuit 405-2.

Therefore, the second embodiment of the disclosure detects the time period between the triggering time point DP and the occurrence of the interference pulse ERP in FIG. 9 and records the same as a masking time period Tdn, and uses the recorded plurality of sets of historical masking time periods to average and generate a dynamic masking time period, so that the embodiment can automatically adjust the masking time for the switching signal, thereby adaptively reducing the interference of the current environment to the signal. Specifically, the noise trigger detector 810 in FIG. 8 determines whether the setting signal VSETa has a complete pulse after the triggering time point DP, such as the complete pulse ERP in FIG. 9. If the noise trigger detector 810 determines that the setting signal VSETa has the complete pulse ERP, then it is detected whether a first state S1 corresponding to the switching terminal signal LXa in the voltage conversion device 405-2 at the triggering time point DP (e.g., the first state S1 in FIG. 9 is logic 0) is the same as a second state (e.g., a second state S2 in FIG. 9 is logic 0) corresponding to the switching terminal signal LXa at a time point EDP when the setting signal VSETa has the complete pulse.

In the case where the first state is different from the second state, it means that the switching terminal signal LXa performs a normal voltage conversion function in response to the setting signal VSETa. Therefore, the pulses on the setting signal VSETa are pulses generated by the normal voltage feedback function. Correspondingly, in a case where the first state S1 (logic 0) is the same as the second state S2 (logic 0) (as shown by an arrow 910), since the enabling time of the complete pulse ERP is short and the switching terminal signal LXa does not increase in response to the setting signal VSETa and ends the complete pulse ERP, meaning that the complete pulse ERP on the setting signal VSETa is actually triggered by interference, the noise trigger detector 810 records the time period between the triggering time point DP and the time point EDP when the setting signal VSETa has the complete pulse ERP as the masking time period Tdn.

In other words, the second embodiment uses the setting signal VSETa and the switching terminal signal LXa inside the voltage conversion device 405-2 to distinguish whether the pulse on the setting signal VSETa is a pulse that has exerted a normal voltage feedback function or is a pulse that is generated due to interference, so as to determine the cutoff point of the aforementioned dynamic masking time, and then obtain the masking time period Tdn and records the same.

The control logic circuit 840 receives and records the masking time period (e.g., the masking time period Tdn in FIG. 8) recorded by the sample hold circuit 830, and generates an average masking time period by averaging the masking time period with a plurality of historical masking time periods. Then, the control logic circuit 840 generates the processed switching signal PWMPa by masking a part of time period of the switching signal PWMa according to the average masking time period.

Here the "fixed masking time" and the "dynamic masking time" are compared and explained. Taking the "fixed masking time" mentioned in the first embodiment as an example, since the fixed masking time must be designed according to the worst case scenario, it is very likely that the masking time will be designed to be too long such that the reaction time of the feedback control in the voltage conversion circuit is compressed. On the other hand, if the number of voltage conversion circuits in the power supply system increases, the aforementioned fixed masking time may also increase accordingly. On the other hand, taking the "dynamic masking time" described in the second embodiment as an example, although it is necessary to record a plurality of masking time periods and the control thereof is more complicated, when the number of voltage conversion circuits increases, the design side effects (the reaction time of the feedback control) of the masking time of the second embodiment will also be correspondingly lower.

Figure 10:
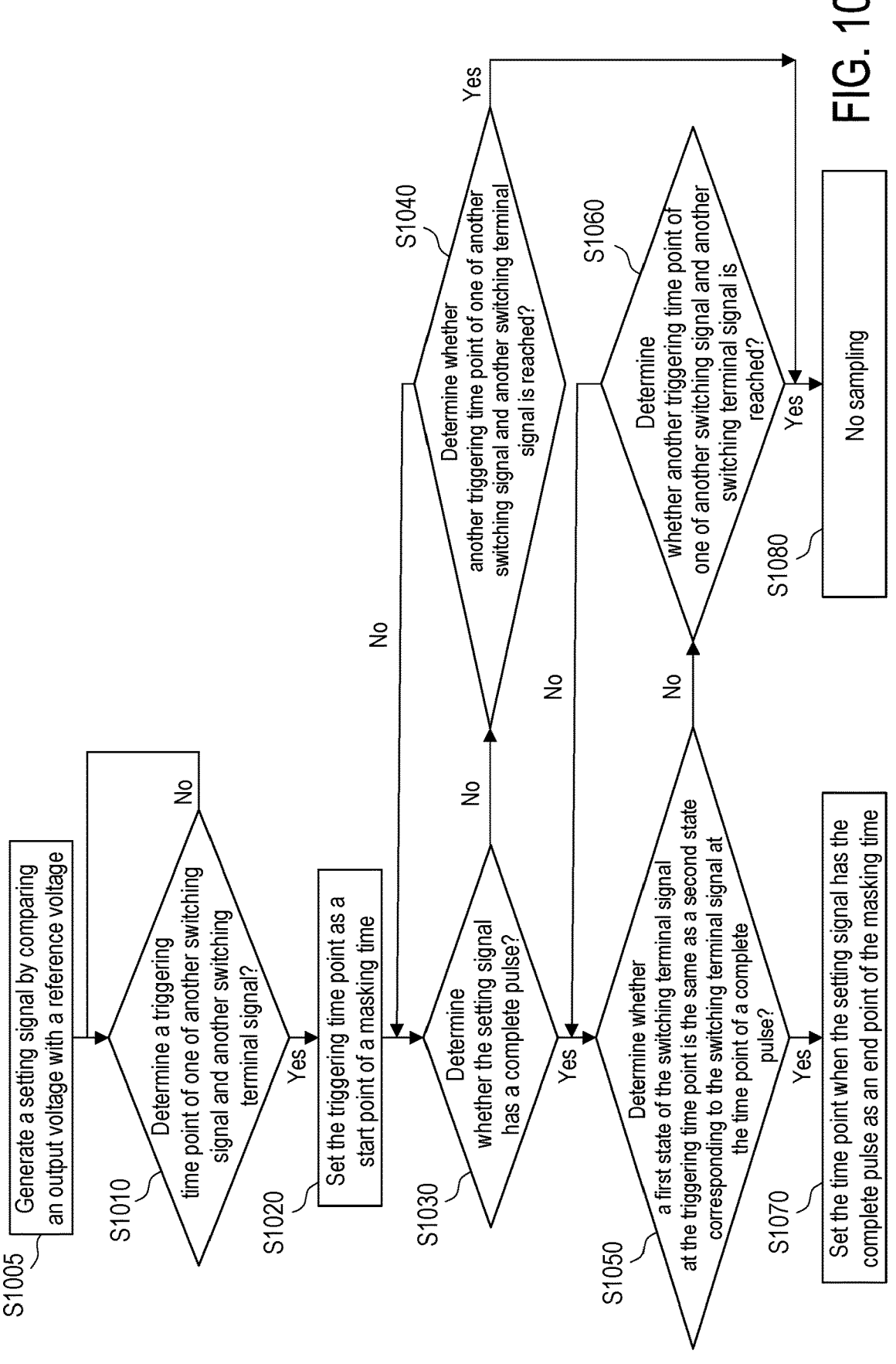
FIG. 10 is a detailed flowchart of step S520 in FIG. 5 and implemented with dynamic masking time.

FIG. 10 is a detailed flowchart of step S520 in FIG. 5 and implemented with the aforementioned dynamic masking time. Please refer to FIG. 8, FIG. 9, and FIG. 10 at the same time. In step S1005, the setting signal VSETa is generated by comparing the output voltage on the output terminal VOUTa with the reference voltage VREFa. In step S1010, the noise trigger detector 810 determines the triggering time point of one of another switching signal PWMb and another switching terminal signal LXb (e.g., the triggering time point DP in FIG. 9). Those who apply the embodiment can selectively provide one of the switching signal PWMb and the switching terminal signal LXb to the noise trigger detector 810 according to their requirements and circuit design conditions and proceed to step S1010.

When step S1010 is YES, the sample hold circuit 830 in FIG. 8 sets the triggering time point DP as the start point of the masking time. Moreover, in step S1030, the sample and hold circuit 830 in FIG. 8 determines that the setting signal VSETa has the complete pulse (e.g., the complete pulse ERP in FIG. 9) after the triggering time point DP. The complete pulse ERP in the embodiment means that the setting signal VSETa sequentially triggers one positive edge and one negative edge (which can be said to complete a complete pulse pattern).

In step S1040, the sample and hold circuit 830 in FIG. 8 also determines whether another triggering time point of one of another switching signal and another switching terminal signal is reached in the determination of step S1030. If step S1040 is yes, it means that the setting signal VSETa has not been detected to have the complete pulse in step S1030, so step S1080 is entered and no sampling is performed in this masking time period.

When step S1030 is yes, step S1050 is entered. When the setting signal VSETa after the triggering time point DP has the complete pulse, the sample hold circuit 830 in FIG. 8 determines whether the first state corresponding to the switching terminal signal LXa in the voltage conversion device 405-1 at the triggering time point DP is the same as the second state corresponding to the switching terminal signal LXa at the time point when the setting signal VSETa has the complete pulse.

In step S1050, the sample and hold circuit 830 in FIG. 8 also determines whether another triggering time point of one of another switching signal and another switching terminal signal is reached in the determination of step S1060. If step S1060 is yes, it means that the first state and the second state in step S1050 are not the same, so step S1080 is entered and no sampling is performed for this masking time period.

When step S1030 is yes (the first state and the second state are the same), then step S1070 is entered. When the setting signal VSETa after the triggering time point DP has the complete pulse, the sample hold circuit 830 in FIG. 8 will set the time point EDP when the setting signal VSETa has the complete pulse ERP as the end point of the masking time, and the time period between the start point of the masking time and the end point of the masking time is regarded as the masking time period Tdn. Then, the control logic circuit 840 in FIG. 8 generates the processed switching signal PWMPa by dynamically adjusting the switching signal PWMa in the second voltage conversion device 405-2 according to the masking time period Tdn.

In the embodiment, based on the accumulated recorded data controlled by the dynamic masking time, the voltage conversion device as the tested group can determine the severity of interference in its environment by itself and transmit to the driver of another voltage conversion device as the interference source through the interference notification signal, thereby controlling or adjusting the speed of the driving circuit of another voltage conversion device, and further improving the degree of interference caused by the switching of the driving circuit.

Figure 11:
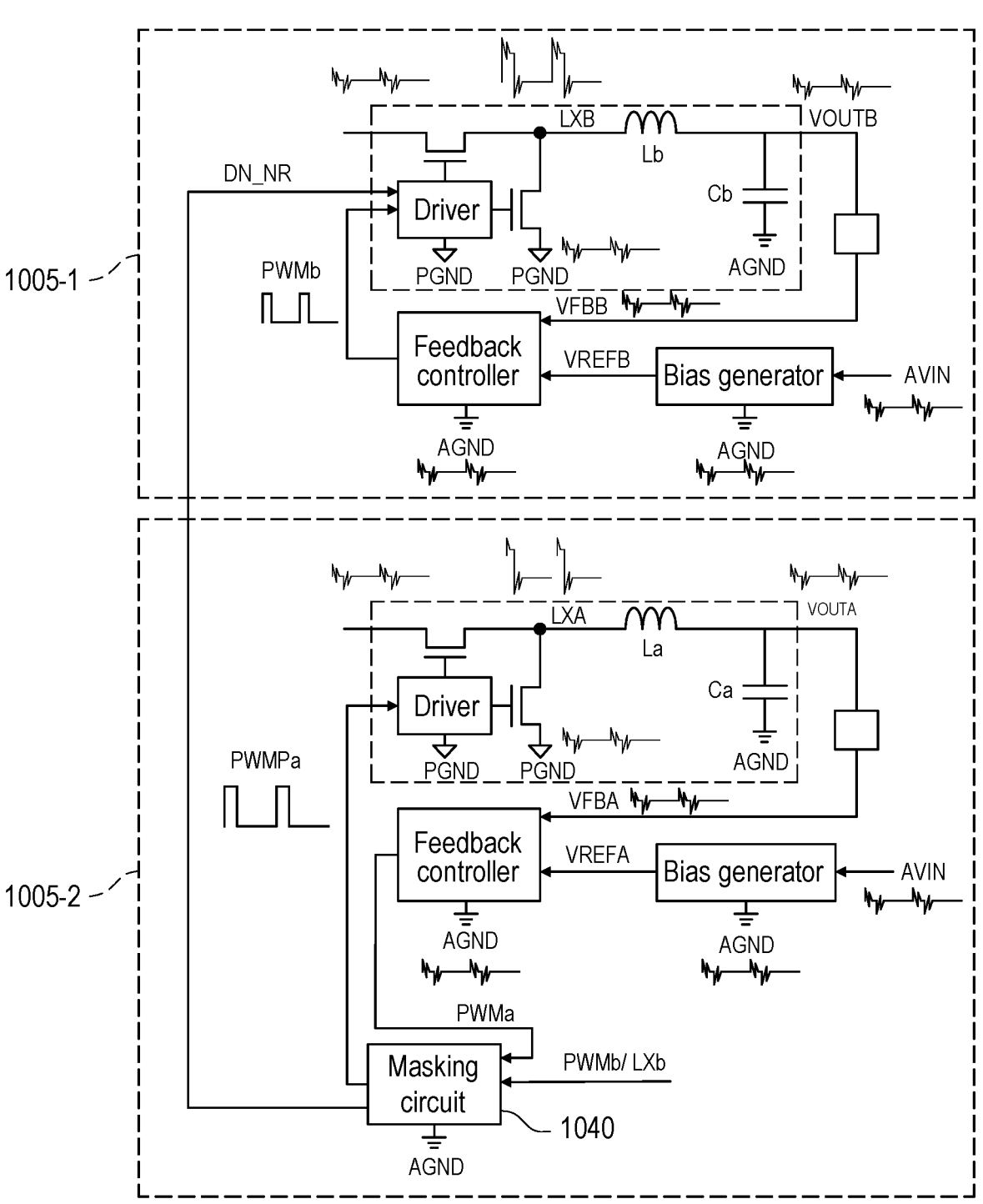
FIG. 11 is a schematic block diagram of two voltage conversion devices according to another corresponding embodiment of the disclosure.

FIG. 11 is a schematic block diagram of two voltage conversion devices 1005-1 and 1005-2 according to another corresponding embodiment of the disclosure. Taking FIG. 11 as an example, assume that the first voltage conversion device 1005-1 is the interference source and the second voltage conversion device 1005-2 is the tested group. When the interference condition of the operating environment of the first voltage conversion device 1005-1 severely and significantly affects the switching signal of the second voltage conversion device 1005-2, the time length calculated by the second voltage conversion device 1005-2 that masks a part of time period of the second switching signal (i.e., the masking time) will be longer than the preset masking design value, and will then compress the reaction time of the feedback circuit in the second voltage conversion device 1005-2 (e.g., the feedback voltage generator and the feedback controller in the second voltage conversion device 1005-2 in FIG. 11). In this state, the second voltage conversion device 1005-2 can provide an interference notification signal DN_NR from a masking circuit 1040 to the driver of the first voltage conversion device 1005-1 and reduce the switching driving speed thereof through control or communication, so that the interference energy at the switching point LXb in the voltage conversion device 1005-1 is reduced. In this way, the influence of interference on the second voltage conversion device 1005-2 is also reduced such that the second voltage conversion device 1005-2 does not need to continue to extend the masking time and can operate normally.

To sum up, the voltage conversion device, the power supply system, and the interference suppression method according to the embodiments of the disclosure are to add the masking circuit to the voltage conversion device to detect the switching signal or the switching terminal signal of other voltage conversion devices with common nodes and correspondingly mask its own switching signal for a part of time period, so that the switching signal may be prevented from being accidentally subjected to resonance interference of other voltage conversion devices and causing malfunction during the part of time period when the switching signal is masked. Therefore, the embodiments of the disclosure can mask resonance interference from other voltage conversion devices to maintain the stability of its own voltage conversion function.

What is claimed is:

1. A voltage conversion device, comprising:
   a first input terminal to obtain a first input voltage;
   a feedback controller to provide a first switching signal based on a feedback voltage, wherein the feedback voltage is generated based on an output voltage of the voltage conversion device;
   a masking circuit to generate a processed switching signal by masking a part of time period of the first switching signal according to one of another switching signal and another switching terminal signal of another voltage conversion device; and
   a driving circuit, coupled to the first input terminal and the masking circuit to provide the output voltage according to the first input voltage and the processed switching signal,
   wherein the masking circuit comprises:
   an edge trigger detector to determine a triggering time point according to one of the another switching signal and the another switching terminal signal;
   a mask signal generator, coupled to the edge trigger detector to generate a mask signal, wherein the mask signal comprises a masking pulse corresponding to the triggering time point; and
   a control logic circuit, coupled to the mask signal generator to generate the processed switching signal by masking the part of time period of the first switching signal based on the masking pulse.

2. The voltage conversion device according to claim 1, wherein the edge trigger detector determines that the triggering time point of the one of the another switching signal and the another switching terminal signal is a rising edge triggering time point or a falling edge triggering time point, and the triggering time point is based on a triggering mechanism of the driving circuit in the voltage conversion device.

3. The voltage conversion device according to claim 1, wherein the masking circuit comprises:

a voltage comparator to generate a setting signal by comparing the output voltage and a reference voltage;

a sample hold circuit, coupled to the voltage comparator and the edge trigger detector to determine that the setting signal has a complete pulse after the triggering time point, and to determine whether a first state corresponding to a switching terminal signal in the voltage conversion device at the triggering time point is the same as a second state corresponding to the switching terminal signal at a time point when the setting signal has the complete pulse, wherein in a case where the first state is the same as the second state, the sample hold circuit records a time period between the triggering time point and the time point when the setting signal has the complete pulse as a masking time period; and the control logic circuit, coupled to the sample hold circuit to receive and record the masking time period, generate an average masking time period by averaging the masking time period with a plurality of historical masking time periods, and generate the processed switching signal by masking the part of time period of the first switching signal based on the average masking time period.

4. The voltage conversion device according to claim 3, further comprising:

a second input terminal to receive a second input signal; and a bias generator, coupled to the second input terminal to obtain the second input signal, wherein the bias generator generates the reference voltage according to the second input signal.

5. The voltage conversion device according to claim 1, wherein the driving circuit comprises:

a driver to generate a first switching control signal and a second switching control signal based on the processed switching signal;

a first switch, wherein a first terminal of the first switch is coupled to the first input terminal, and a control terminal of the first switch receives the first switching control signal;

a second switch, wherein a first terminal of the second switch is coupled to a second terminal of the first switch, and a control terminal of the second switch receives the second switching control signal; and an inductor-capacitor circuit, wherein an input terminal of the inductor-capacitor circuit is coupled to the second terminal of the first switch, and the inductor-capacitor circuit is coupled to an output terminal of the voltage conversion device, wherein the driver controls the first switch and the second switch through the first switching control signal and the second switching control signal to provide the output voltage at the output terminal of the voltage conversion device.

6. The voltage conversion device according to claim 1, further comprising:

a feedback voltage generator, coupled to an output terminal of the voltage conversion device to generate the feedback voltage according to the output voltage.

7. A power supply system, comprising:

a first voltage conversion device, coupled to a first ground terminal and a second ground terminal, wherein the first voltage conversion device converts a first input voltage into a first output voltage according to a first switching signal and a first switching terminal signal; and a second voltage conversion device, wherein the second voltage conversion device comprises:

a first input terminal to obtain the first input voltage;

a feedback controller, coupled to the second ground terminal to provide a second switching signal based on a feedback voltage, wherein the feedback voltage is generated based on a second output voltage of the second voltage conversion device;

a masking circuit, coupled to the feedback controller to generate a processed switching signal by masking a part of time period of the second switching signal according to one of the first switching signal and the first switching terminal signal; and a driving circuit, coupled to the first input terminal and the masking circuit to provide the second output voltage according to a second input voltage and the processed switching signal.

8. The power supply system according to claim 7, wherein the masking circuit comprises:

an edge trigger detector to determine a triggering time point of one of another switching signal and another switching terminal signal;

a mask signal generator, coupled to the edge trigger detector to generate a mask signal, wherein the mask signal comprises a masking pulse corresponding to the triggering time point; and a control logic circuit, coupled to the mask signal generator to generate the processed switching signal by masking the part of time period of the second switching signal based on the masking pulse in the mask signal.

9. The power supply system according to claim 8, wherein the edge trigger detector determines that the triggering time point of the one of the another switching signal and the another switching terminal signal is a rising edge triggering time point or a falling edge triggering time point, and a selection of the triggering time point is based on a triggering mechanism of the driving circuit in the voltage conversion device.

10. The power supply system according to claim 7, wherein the masking circuit comprises:

a voltage comparator to generate a setting signal by comparing the second output voltage and a reference voltage;

an edge trigger detector to determine a triggering time point of the one of the first switching signal and the first switching terminal signal;

a sample hold circuit, coupled to the voltage comparator and the edge trigger detector to determine that the setting signal has a complete pulse after the triggering time point, and to determine whether a first state corresponding to a second switching terminal signal in the second voltage conversion device is the same as a second state corresponding to the second switching terminal signal at a time point when the setting signal has the complete pulse, wherein in a case where the first state is the same as the second state, the sample hold circuit records a time period between the triggering time point and the time point when the setting signal has the complete pulse as a masking time period; and a control logic circuit, coupled to the sample hold circuit to receive and record the masking time period, generate an average masking time period by averaging the masking time period with a plurality of historical masking time periods, and generate the processed switching signal by masking the part of time period of the switching signal based on the average masking time period.

11. The power supply system according to claim 7, wherein when the masking circuit in the second voltage conversion device determines that a time length of the part of time period configured to mask the second switching signal is longer than a preset masking design value, the masking circuit provides an interference notification signal to a driver of the first voltage conversion device, so that the driver reduces the switching driving speed to reduce an interference energy of a switching point in the first voltage conversion device.

12. An interference suppression method for a voltage conversion device, wherein the interference suppression method comprises:

providing a first switching signal based on a feedback voltage, wherein the feedback voltage is generated based on an output voltage of the voltage conversion device;

generating a processed switching signal by masking a part of time period of the first switching signal according to one of another switching signal and another switching terminal signal of another voltage conversion device; and providing the output voltage according to a first input voltage and the processed switching signal, wherein a step of generating the processed switching signal by masking the part of time period of the first switching signal according to the one of the another switching signal and the another switching terminal signal of the another voltage conversion device comprises:

determining a triggering time point of the one of the another switching signal and the another switching terminal signal;

generating a mask signal according to the triggering time point, wherein the mask signal comprises a masking pulse corresponding to the triggering time point; and generating the processed switching signal by masking the part of time period of the first switching signal based on the masking pulse in the mask signal.

13. The interference suppression method according to claim 12, wherein the triggering time point of the one of the another switching signal and the another switching terminal signal is determined to be a rising edge triggering time point or a falling edge triggering time point, wherein a selection of the triggering time point is based on a triggering mechanism of a driving circuit in the voltage conversion device.

14. The interference suppression method according to claim 12, wherein a step of generating the processed switching signal by masking the part of time period of the first switching signal according to the one of the another switching signal and the another switching terminal signal of the another voltage conversion device comprises:

generating a setting signal by comparing the output voltage and a reference voltage;

determining that the setting signal has a complete pulse after the triggering time point;

when the setting signal after the triggering time point has the complete pulse, determining whether a first state corresponding to a switching terminal signal in the voltage conversion device at the triggering time point is the same as a second state corresponding to the switching terminal signal at a time point when the setting signal has the complete pulse;

in a case where the first state is the same as the second state, recording a time period between the triggering time point and the time point when the setting signal has the complete pulse as a masking time period;

recording the masking time period;

generating an average masking time period by averaging the masking time period with a plurality of historical masking time periods; and generating the processed switching signal by masking the part of time period of the first switching signal based on the average masking time period.

* * * * *